United States Patent
Kümmlee

(10) Patent No.: US 9,287,749 B2
(45) Date of Patent: Mar. 15, 2016

(54) MACHINE HAVING A BACK-UP BEARING HAVING A HYBRID ARRANGEMENT

(71) Applicant: Siemens Aktiengesellschaft, München (DE)

(72) Inventor: Horst Kümmlee, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/382,493

(22) PCT Filed: Mar. 1, 2013

(86) PCT No.: PCT/EP2013/054127
§ 371 (c)(1),
(2) Date: Sep. 2, 2014

(87) PCT Pub. No.: WO2013/127980
PCT Pub. Date: Sep. 6, 2013

(65) Prior Publication Data
US 2015/0097457 A1   Apr. 9, 2015

(30) Foreign Application Priority Data
Mar. 2, 2012  (DE) .................... 10 2012 203 340

(51) Int. Cl.
| | |
|---|---|
| H02K 7/09 | (2006.01) |
| F16C 32/04 | (2006.01) |
| F16C 41/00 | (2006.01) |
| F16C 39/02 | (2006.01) |
| F16C 33/12 | (2006.01) |
| F16C 17/02 | (2006.01) |
| F16C 33/10 | (2006.01) |

(52) U.S. Cl.
CPC  *H02K 7/09* (2013.01); *F16C 17/02* (2013.01); *F16C 32/048* (2013.01); *F16C 32/0442* (2013.01); *F16C 33/122* (2013.01);
(Continued)

(58) Field of Classification Search
CPC ....... H02K 7/09; F16C 32/048; F16C 41/004; F16C 17/02; F16C 39/02; F16C 33/122
USPC ........................................... 310/90.5
See application file for complete search history.

(56) References Cited

U.S. PATENT DOCUMENTS 4,000,982 A * 1/1977 Ueda .............................. 428/545
4,504,554 A * 3/1985 Yoshioka et al. .............. 428/683
(Continued)

FOREIGN PATENT DOCUMENTS

| DE | 3813804 A1 | 11/1989 |
|---|---|---|
| DE | 102009019593 A1 | 12/2010 |

(Continued)

*Primary Examiner* — Terrance Kenerly
(74) *Attorney, Agent, or Firm* — Henry M. Feiereisen LLC

(57) ABSTRACT

A machine having a stator and a rotor having a rotor shaft supported in bearings, such that the rotor is rotatable about a rotation axis. The bearings are designed as active magnetic bearings in which the rotor is supported without contact. A respective back-up bearing is associated with each active magnetic bearing to catch the rotor when the respective active magnetic bearing fails. The respective back-up bearing has a bushing arranged on the rotor shaft and a sliding device arranged on the stator. The respective bushing has an inner ring arranged radially inside to fasten the bushing on the rotor shaft, and an outer ring that surrounds the inner ring radially outside and slides in the sliding device of the respective back-up bearing when the respective active magnetic bearing fails. The inner and outer rings are made of different materials and are connected to each other in a bonded manner.

10 Claims, 2 Drawing Sheets

(52) U.S. Cl.
CPC .............. F16C 39/02 (2013.01); F16C 41/004 (2013.01); F16C 32/0474 (2013.01); F16C 33/1085 (2013.01); F16C 2204/10 (2013.01); F16C 2380/26 (2013.01)

(56) References Cited

U.S. PATENT DOCUMENTS

| | | | |
|---|---|---|---|
| 5,083,053 A | * | 1/1992 | New ............................. 310/90.5 |
| 5,693,994 A | * | 12/1997 | New ............................. 310/90.5 |
| 5,730,097 A | * | 3/1998 | Aoyama ................... 123/196 R |
| 6,933,647 B2 | | 8/2005 | Kuemmlee et al. |
| 2006/0250037 A1 | | 11/2006 | Kuemmlee |
| 2008/0310777 A1 | * | 12/2008 | Kim et al. ....................... 384/13 |
| 2009/0201111 A1 | * | 8/2009 | Filatov ......................... 335/209 |

FOREIGN PATENT DOCUMENTS

| | | |
|---|---|---|
| DE | 102009019593 B4 | 3/2011 |
| EP | 0411695 A2 | 2/1991 |
| EP | 0499309 A1 | 8/1992 |
| WO | WO 9601956 A1 | 1/1996 |

* cited by examiner

MACHINE HAVING A BACK-UP BEARING HAVING A HYBRID ARRANGEMENT

CROSS-REFERENCES TO RELATED APPLICATIONS

This application is the U.S National Stage of International Application No. PCT/EP 2013/054127, filed Mar. 1, 2013, which designated the United States and has been published as International Publication No. WO 2013/127980 and which claims the priority of German Patent Application, Ser. No. 12012203340.8, filed Mar. 2, 2012, pursuant to 35 U.S.C. 119(a)-(d).

BACKGROUND OF THE INVENTION

The present invention relates to a machine,
wherein the machine has a stator and a rotor,
wherein the rotor has a rotor shaft,
wherein the rotor shaft is supported in bearings such that the rotor can be rotated about an axis of rotation,
wherein the bearings are embodied as active magnetic bearings in which the rotor is supported in a contactless manner,
wherein a back-up bearing is associated with each of the active magnetic bearings, the rotor being caught by the back-up bearings in the event of a failure of the respective active magnetic bearing, and
wherein the respective back-up bearing has a bushing arranged on the rotor shaft and a sliding device arranged on the stator.

Machines of said type are generally known.

In magnetic bearings, shafts are supported in a contactless manner. There is consequently no wear and tear and virtually no frictional losses occur. However, magnetic bearings must be active, i.e. supplied with electric power. They are therefore liable to fail. For this reason a contact-making emergency bearing (=back-up bearing) must be present. Said emergency bearings ensure the rotor runs down safely to a stop in the event of a failure of the active magnetic bearing. They wear out relatively quickly if they are required and must therefore be replaceable.

In prior art rotors operating at high speeds—for example 5000 rpm and more—and/or being high in weight—for example 5 tonnes and more—use is often made of back-up bearings consisting of a bushing arranged on the rotor shaft and a sliding device arranged on the stator and operatively interacting with the bushing. The bushings according to the prior art consist of high-strength copper alloys (in particular chrome-nickel-silicon-copper alloys) which are fitted onto the rotor shaft thermally or by means of oil pressure methods. The bushings must firstly exhibit a very high degree of thermal conductivity in order to absorb and dissipate the frictional energy occurring when the rotor runs down to a stop. Secondly, the bushings must possess the requisite mechanical stability.

The bushings are provided with a high degree of shrink interference in order to ensure they are firmly seated on the rotor shaft. This leads to high tangential stresses. Under high static load, however, the high-strength copper alloys of the prior art tend to exhibit signs of stress relaxation which can lead to grain boundary dissolution with subsequent sudden failure of the bushings. Even relatively low temperature levels (less than 100° C.) can suffice in order to provoke damage of this type.

SUMMARY OF THE INVENTION

The object of the present invention is to develop the back-up bearing of a machine of the type cited in the introduction in such a way that the problems of the prior art no longer occur.

The object is achieved by a machine having a stator and a rotor, wherein the rotor has a rotor shaft, wherein the rotor shaft is supported in bearings such that the rotor can be rotated about an axis of rotation, wherein the bearings are embodied as active magnetic bearings in which the rotor is supported in a contactless manner, wherein a back-up bearing is associated with each of the active magnetic bearings, the rotor being caught by the back-up bearings in the event of a failure of the respective active magnetic bearing, wherein the respective back-up bearing has a bushing arranged on the rotor shaft and a sliding device arranged on the stator, wherein the respective bushing has a radially inwardly arranged inner ring by means of which the bushing is fastened to and retained on the rotor shaft, wherein the respective bushing has an outer ring radially outwardly surrounding the inner ring, which outer ring slides in the sliding device of the respective back-up bearing in the event of a failure of the respective active magnetic bearing, wherein the inner ring and the outer ring are made of different materials, and wherein the inner ring and the outer ring are joined to each other by a material bond.

Advantageous embodiments of the machine are the subject matter of dependent claims.

The material bond between inner ring and outer ring can consist in particular of a welded joint. The inner ring and the outer ring can therefore be welded to each other. The welded joint can be produced in particular by means of a diffusion welding process.

Typically, the inner ring is made of a metal. More particularly it can be made from steel.

The outer ring is usually made of a copper alloy. Alternatively, the outer ring can consist of a powder mixture of copper and aluminum oxide or copper and a carbide. In this case in particular the individual powder grains of the powder mixture can already consist of the cited materials.

In order to produce a good material bond between the inner ring and the outer ring it may be necessary to arrange an intermediate layer between the inner ring and the outer ring. The intermediate layer can be made of nickel, for example.

It is possible for radially and/or axially extending oil ducts to be arranged in the bushing. If this is the case, however, the oil ducts will be present only in the inner ring. The outer ring will have no such ducts.

BRIEF DESCRIPTION OF THE DRAWING

The above-described characteristics, features and advantages of this invention, as well as the manner in which these are achieved, will become clearer and more readily understandable in connection with the following description of the exemplary embodiments, which are explained in more detail in conjunction with the schematic drawings, in which.

DETAILED DESCRIPTION OF PREFERRED EMBODIMENTS

Figure 1:
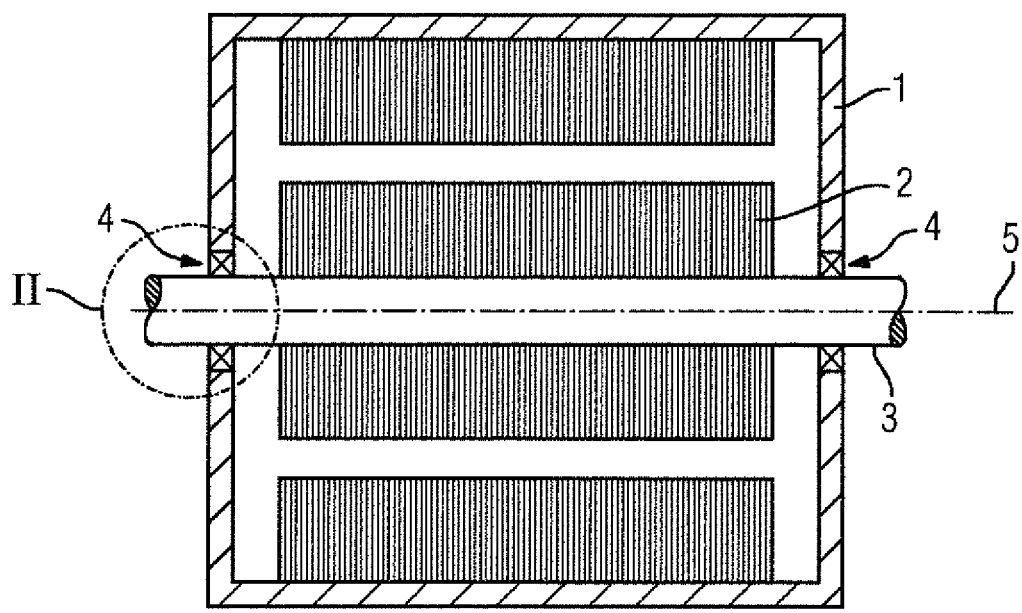
FIG. 1 shows a machine.

According to FIG. 1, a machine has a stator 1 and a rotor 2. It is possible for the stator 1 and the rotor 2 to be the electromagnetic active components of an electric machine. This is not absolutely essential, however. What is meant by the terms "stator" and "rotor" is simply that the former constitutes a stationary component (stator 1) and the latter a rotating component (rotor 2). The machine can therefore be—for example—a gearing mechanism, a pump, a turbine, etc.

The rotor 2 has a rotor shaft 3. The rotor shaft 3 is supported in bearings 4. The rotor 2 is therefore able to rotate about an axis of rotation 5. The axis of rotation 5 generally runs horizontally.

Insofar as the terms "axial", "radial" and "tangential" are used hereinbelow, they relate in all cases to the axis of rotation 5. "Axial" denotes a direction parallel to the axis of rotation 5. "Radial" denotes a direction orthogonal to the axis of rotation 5 toward or away from the axis of rotation 5. "Tangential" denotes a direction that is orthogonal both to the axial direction and to the radial direction. "Tangential" therefore designates a direction at a constant radial distance from the axis of rotation 5 circularly around the axis of rotation 5.

Figure 2:
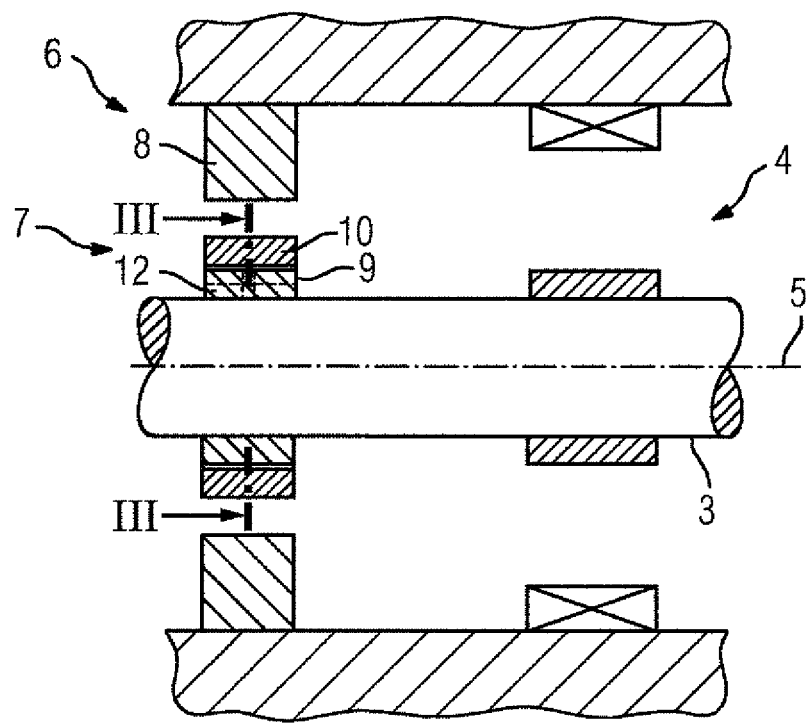
FIG. 2 shows a bearing arrangement of the machine from FIG. 1.

According to FIG. 2, the bearings 4 of the machine are embodied as active (=electromagnetic) magnetic bearings 4. The rotor 2 is supported in the active magnetic bearings 4 in a contactless manner.

The active magnetic bearings 4 may fail. For this reason a back-up bearing 6 is associated with each of the active magnetic bearings 4. In the event of a failure of the respective active magnetic bearing 4, the rotor 2 is caught by the back-up bearings 6. The respective back-up bearing 6 has a bushing 7 arranged on the rotor shaft 3 and a sliding device 8 arranged on the stator 1.

If the active magnetic bearings 4 fail, the rotor 2 is, as already mentioned, caught by the back-up bearings 6. In this state the respective bushing 7 comes into contact with the respective sliding device 8 and slides there. The magnetic bearings 4 continue to remain contact-free.

Figure 3:
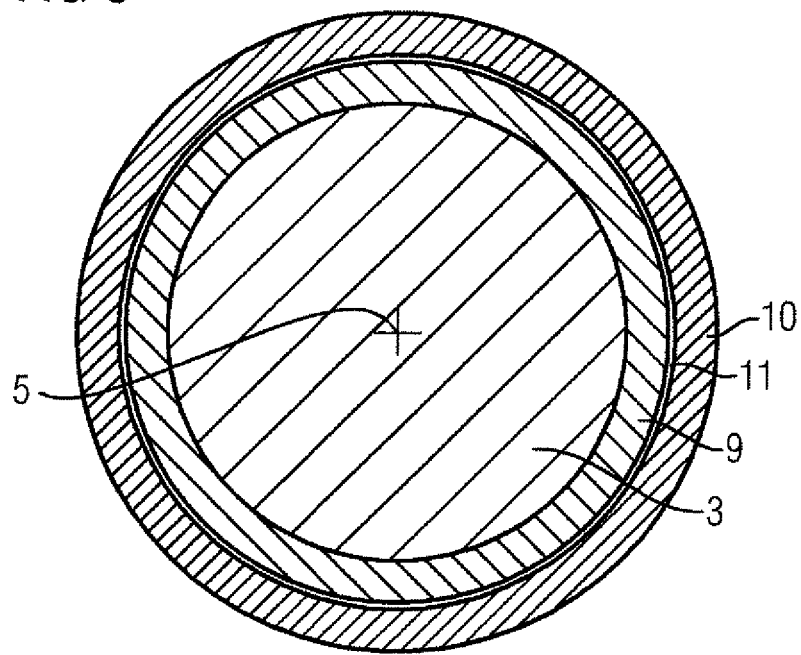
FIG. 3 shows a back-up bearing.
Figure 4:
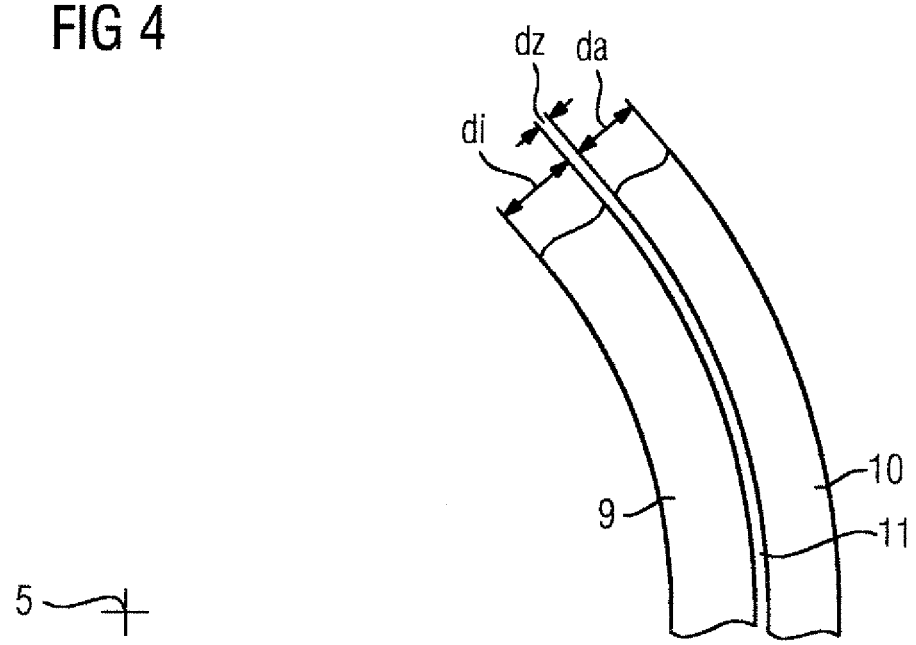
FIG. 4 shows a detail from FIG. 3.

The respective bushing 7 has—see also FIGS. 3 and 4—an inner ring 9. The inner ring 9 is arranged radially inwardly. The bushing 7 is mounted on the rotor shaft 3 by means of the inner ring 9 and retained there. The respective bushing 7 additionally has an outer ring 10. The outer ring 10 surrounds the inner ring 9 radially outwardly. The outer ring 10 is that element of the bushing 7 which in the event of a failure of the respective active magnetic bearing 4 slides in the sliding device 8 of the respective back-up bearing 6.

The inner ring 9 and the outer ring 10 are made of different materials. They are joined to each other by a material bond. In particular they may be welded to each other. The welded joint can be produced for example by means of hot isostatic pressing (HIP), in particular by means of a diffusion welding process.

The material of the inner ring 9 can be determined according to requirements. In particular the inner ring 9 may consist of a metal, of steel for example. The material of the outer ring 10 can likewise be determined according to requirements. The outer ring 10 may consist of a copper alloy, for example.

In a particularly preferred embodiment, the outer ring 10 consists of a powder mixture of copper and aluminum oxide. In this case it is possible to mix copper powder and aluminum oxide powder in a suitable (per se known) mixing ratio and thereafter to process the mixture. Alternatively, it is possible for the individual grains of the powder already to contain copper and aluminum oxide in the appropriate mixing ratio. The cited mixture of copper and aluminum oxide has the advantage that both the material strength and the thermal properties can be achieved almost independently of the heat treatment. The heat treatment can therefore be tailored during the pressing process to ensure that a good bond with the inner ring 9 is produced. Alternatively, a carbide, in particular aluminum carbide, can be used instead of aluminum oxide.

In many cases it may be possible for the inner ring 9 and the outer ring 10 to be welded directly to each other. In other cases it may be necessary to arrange an intermediate layer 11 between the inner ring 9 and the outer ring 10. The intermediate layer 11 may be made in particular of nickel.

The intermediate layer 11, if present, has a relatively small material thickness dz. In particular its material thickness dz is typically a maximum of 0.2 mm, in most cases even less than 0.1 mm. In contrast, material thicknesses di, da of the inner ring 9 and of the outer ring 10 generally lie in the range of several mm, often even above 10 mm.

It is possible for the inner ring 9 to have oil ducts 12, according to the schematic illustrated in FIG. 2. According to the schematic illustrated in FIG. 2, the oil ducts 12 can extend radially and/or axially. Irrespective of whether the oil ducts 12 are present or not, however, the outer ring 10 has no ducts of said type.

The present invention has many advantages. In particular the relatively failure-prone design that results when the bushing 7 is made from a single material can be avoided. Because the bushing 7 is subdivided into the inner ring 9 and the outer ring 10, the two rings 9, 10 can be optimized for their respective function separately from each other. Furthermore, the oil ducts 12 can be incorporated without increasing the risk of failure.

Although the invention has been illustrated and described in greater detail on the basis of the preferred exemplary embodiment, it is not limited by the disclosed examples and other variants can be derived herefrom by the person skilled in the art without leaving the scope of protection of the invention.

The invention claimed is:

1. A machine, comprising:
a stator;
a rotor having a rotor shaft and located radially inside the stator so that the stator extend over a whole length of the rotor;
a bearing configured as active magnetic bearing to support the rotor shaft in a contactless manner for rotation about an axis of rotation; and
a back-up bearing operably connected to the active magnetic bearing and configured to catch the rotor in the event of a failure of the active magnetic bearing, said back up bearing having a sliding device arranged directly on a radially inner surface of the stator and a bushing which is arranged radially inside the sliding device at a radial distance from the sliding device, said bushing having a radially inwardly arranged inner ring located directly on the rotor shaft to fasten and retain the bushing on the rotor shaft, an outer ring disposed in radially outwardly surrounding relationship to the inner ring at a radial distance from the sliding device to form a gap therebetween and configured to slide in the sliding device of the back-up bearing in the event of a failure of the active magnetic bearing in a surface-to-surface sliding contact between the outer ring of the bushing and the sliding device, and an intermediate layer arranged radially between the inner ring and the outer ring, said inner and outer rings of the bushing being made of different materials and joined to each other by a material bond formed by the intermediate layer.

2. The machine of claim 1, wherein the inner ring and the outer ring are welded to each other.

3. The machine of claim 2, wherein the intermediate layer is made of nickel.

4. The machine of claim 1, wherein the inner ring is made of metal.

5. The machine of claim 1, wherein the inner ring is made of steel.

6. The machine of claim 1, wherein the outer ring is made of a copper alloy.

7. The machine of claim 1, wherein the outer ring is made of powder mixture of copper and aluminum oxide or copper and a carbide.

8. The machine of claim 7, wherein the powder mixture includes powder grains, each said grain being made of copper and aluminum oxide.

9. The machine of claim 1, further comprising an intermediate layer arranged between the inner ring and the outer ring.

10. The machine of claim 1, wherein the inner ring has radially and/or axially extending oil ducts, said outer ring being configured in the absence of any ducts.

* * * * *